US012189759B2

(12) United States Patent
Neugschwandtner et al.

(10) Patent No.: US 12,189,759 B2
(45) Date of Patent: Jan. 7, 2025

(54) RUNTIME-TAILORED SECURITY POLICIES FOR APPLICATIONS

(71) Applicant: Oracle International Corporation, Redwood Shores, CA (US)

(72) Inventors: Matthias Neugschwandtner, Perchtoldsdorf (AT); Hugo Guiroux, Zurich (CH); Paul Elvinger, Zurich (CH)

(73) Assignee: Oracle International Corporation, Redwood Shores, CA (US)

( * ) Notice: Subject to any disclaimer, the term of this patent is extended or adjusted under 35 U.S.C. 154(b) by 707 days.

(21) Appl. No.: 17/465,694

(22) Filed: Sep. 2, 2021

(65) Prior Publication Data

US 2023/0074580 A1 Mar. 9, 2023

(51) Int. Cl.
*G06F 21/00* (2013.01)
*G06F 21/54* (2013.01)

(52) U.S. Cl.
CPC ........ *G06F 21/54* (2013.01); *G06F 2221/033* (2013.01)

(58) Field of Classification Search
CPC .................... G06F 21/54; G06F 2221/033
See application file for complete search history.

(56) References Cited

U.S. PATENT DOCUMENTS

| 7,076,804 B2 * | 7/2006 | Kershenbaum | G06F 9/468 726/30 |
| 7,150,008 B2 | 12/2006 | Cwalina et al. | |
| 7,437,718 B2 | 10/2008 | Fournet et al. | |
| 7,526,758 B2 | 4/2009 | Hasse et al. | |
| 7,617,489 B2 | 11/2009 | Peyton et al. | |
| 8,230,477 B2 | 7/2012 | Centonze | |
| 8,881,288 B1 | 11/2014 | Levy et al. | |
| 9,256,739 B1 | 2/2016 | Roundy et al. | |

(Continued)

OTHER PUBLICATIONS

Guiroux, U.S. Appl. No. 16/809,928, filed Mar. 5, 2020, Notice of Allowance and Fees Due, Feb. 2, 2022.

(Continued)

*Primary Examiner* — Don G Zhao
(74) *Attorney, Agent, or Firm* — Hickman Becker Bingham Ledesma LLP

(57) ABSTRACT

Techniques are described herein for function-level limiting of privileges for a target application. Privileges dependencies for different functions of an application are determined based on static evaluation of the code base. A call graph with nodes representing the application functions is established, and the nodes are associated with the determined privilege dependencies. The graph is modified using iterative backward dataflow analysis to associate the nodes in the graph with privileges that are reachable from each node. Transition-edges are identified within the graph, where a transition-edge connects nodes having different sets of privileges. Function calls implementing the identified transition-edges are replaced, in instructions for the application (e.g., bytecode or machine code), with calls to wrapper functions. Each wrapper function transfers control to a thread other than the caller thread, to which a security policy for the replaced function is applied, and uses the other thread to execute the replaced function.

22 Claims, 12 Drawing Sheets

(56) References Cited

U.S. PATENT DOCUMENTS

| | | | |
|---|---|---|---|
| 9,519,696 B1 | 12/2016 | Roth et al. | |
| 9,600,666 B1* | 3/2017 | Harter | H04L 63/1433 |
| 9,697,018 B2* | 7/2017 | Brutschy | G06F 9/44589 |
| 9,946,879 B1* | 4/2018 | Sharifi Mehr | G06F 21/577 |
| 9,965,618 B1* | 5/2018 | Sharifi Mehr | G06F 21/125 |
| 10,019,572 B1* | 7/2018 | Sharifi Mehr | G06F 21/52 |
| 10,032,031 B1* | 7/2018 | Sharifi Mehr | G06F 21/577 |
| 10,409,995 B1 | 9/2019 | Wasiq et al. | |
| 10,609,041 B1 | 3/2020 | Wilczynski et al. | |
| 10,614,218 B2 | 4/2020 | Peyton, Jr. et al. | |
| 10,812,497 B2 | 10/2020 | Venkatramani et al. | |
| 2002/0169986 A1* | 11/2002 | Lortz | H04L 63/08 726/4 |
| 2002/0184486 A1* | 12/2002 | Kershenbaum | G06F 9/468 713/150 |
| 2004/0040017 A1* | 2/2004 | Kershenbaum | G06F 8/72 717/118 |
| 2005/0039158 A1* | 2/2005 | Koved | G06F 21/53 717/100 |
| 2005/0055565 A1 | 3/2005 | Fournet et al. | |
| 2005/0172126 A1 | 8/2005 | Lange et al. | |
| 2007/0016773 A1* | 1/2007 | Perlman | G06F 21/6218 713/166 |
| 2007/0282841 A1* | 12/2007 | Sreedhar | G06F 21/53 707/999.009 |
| 2008/0201693 A1* | 8/2008 | Centonze | G06F 21/629 717/118 |
| 2008/0201760 A1* | 8/2008 | Centonze | H04L 63/102 726/1 |
| 2008/0306958 A1* | 12/2008 | Sreedhar | G06F 21/53 707/999.009 |
| 2010/0100774 A1 | 4/2010 | Ding et al. | |
| 2010/0169888 A1* | 7/2010 | Hare | H04L 67/535 709/205 |
| 2011/0258617 A1 | 10/2011 | Park et al. | |
| 2012/0284792 A1 | 11/2012 | Liem | |
| 2013/0067532 A1* | 3/2013 | Deakin | G06F 21/54 726/1 |
| 2013/0067592 A1* | 3/2013 | Sreedhar | G06F 21/629 726/27 |
| 2013/0091487 A1 | 4/2013 | Chandra et al. | |
| 2013/0333025 A1* | 12/2013 | Sreedhar | G06F 21/629 726/21 |
| 2014/0196104 A1* | 7/2014 | Chari | H04L 63/102 726/1 |
| 2014/0344924 A1 | 11/2014 | McLachlan et al. | |
| 2015/0161384 A1 | 6/2015 | Gu et al. | |
| 2015/0268941 A1 | 9/2015 | Nakaike et al. | |
| 2016/0182558 A1 | 6/2016 | Tripp | |
| 2017/0255544 A1 | 9/2017 | Plate et al. | |
| 2017/0337123 A1 | 11/2017 | Wang | |
| 2018/0046810 A1* | 2/2018 | Ferrara | H04L 63/1433 |
| 2018/0089439 A1* | 3/2018 | Hay | H04L 63/1433 |
| 2018/0137279 A1 | 5/2018 | Peyton, Jr. et al. | |
| 2018/0330097 A1 | 11/2018 | Dietsch et al. | |
| 2019/0102279 A1* | 4/2019 | Awan | G06F 9/4486 |
| 2019/0156028 A1* | 5/2019 | Hay | G06F 21/563 |
| 2020/0026851 A1 | 1/2020 | Dhankha et al. | |
| 2020/0167155 A1 | 5/2020 | Lu et al. | |
| 2020/0210161 A1 | 7/2020 | Portela Parente et al. | |
| 2020/0404007 A1 | 12/2020 | Singh et al. | |
| 2021/0073107 A1 | 3/2021 | Sharma | |
| 2021/0157924 A1 | 5/2021 | Antoniadis et al. | |
| 2021/0281597 A1 | 9/2021 | Guiroux | |
| 2022/0413902 A1* | 12/2022 | Olszewski | G06F 9/5088 |

OTHER PUBLICATIONS

Guiroux, U.S. Appl. No. 16/809,928, filed Mar. 5, 2020, Non-Final Rejection, Dec. 29, 2021.

Wu et al., "Automatically Partition Software into Least Privilege Components using Dynamic Data Dependency Analysis", IEEE, dated 2013, 11 pages.

Oracle Ksplice, Ksplice—Reboots are a thing of the past!, https://ksplice.oracle.com, printed Jul. 30, 2021, 2pgs.

Ghavamnia, Seyedhamed, et al., "Temporal System Call Specialization for Attack Surface Reduction", 29th USENIX Security Symp, https://www.usenix.org/conference/usenixsecurity20/presentation/ghavamnia, pp. 1749-1766, Aug. 12, 2020, 19pgs.

ASM, https://asm.ow2.io, printed Jul. 30, 2021, 1pg.

* cited by examiner

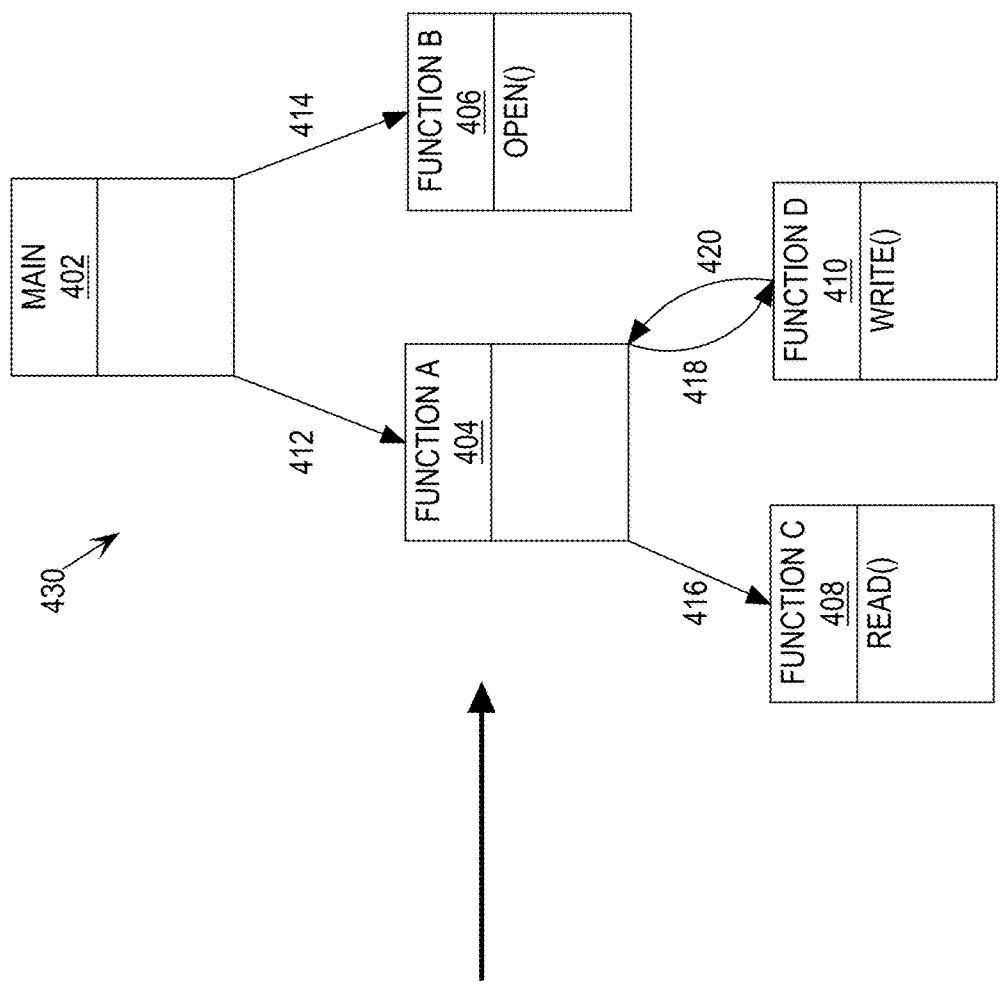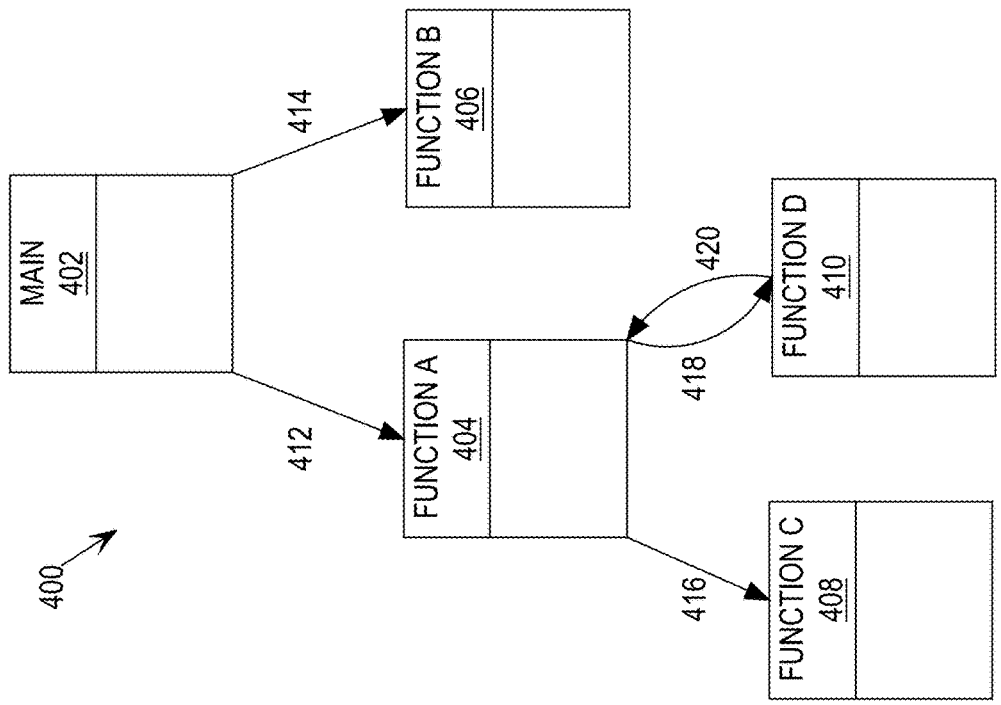
FIG. 4A

502 IDENTIFY A PLURALITY OF FUNCTION SETS, AMONG A PLURALITY OF FUNCTIONS OF A PARTICULAR APPLICATION, THE ONE OR MORE FUNCTIONS OF EACH FUNCTION SET BEING ASSOCIATED WITH A COMMON SET OF PRIVILEGE DEPENDENCIES

504 IDENTIFY ONE OR MORE TRANSITION FUNCTION CALLS IN INSTRUCTIONS FOR THE PARTICULAR APPLICATION, WHERE A TRANSITION FUNCTION CALL INVOKES A TARGET FUNCTION OF A FIRST FUNCTION SET, OF THE PLURALITY OF FUNCTION SETS, FROM WITHIN A CALLER FUNCTION OF A SECOND FUNCTION SET OF THE PLURALITY OF FUNCTION SETS

506 MODIFY THE INSTRUCTIONS FOR THE PARTICULAR APPLICATION, TO PRODUCE MODIFIED INSTRUCTIONS, BY REPLACING EACH TRANSITION FUNCTION CALL, OF THE ONE OR MORE TRANSITION FUNCTION CALLS, WITH A WRAPPER FUNCTION CALL THAT, WHEN EXECUTED, CAUSES A TARGET FUNCTION OF SAID EACH TRANSITION FUNCTION CALL TO BE EXECUTED BY A SEPARATE THREAD WITH ONE OR MORE PRIVILEGES THAT SATISFY A SET OF PRIVILEGE DEPENDENCIES ASSOCIATED WITH A FUNCTION SET THAT INCLUDES THE TARGET FUNCTION

508 STORE THE MODIFIED INSTRUCTIONS IN MEMORY OR ON DISK

FIG. 5

RUNTIME-TAILORED SECURITY POLICIES FOR APPLICATIONS

CROSS-REFERENCE TO RELATED APPLICATIONS

This application is related to U.S. patent application Ser. No. 16/809,928, titled "Tailored Security Configuration of Least-Privilege Applications" (referred to herein as the "Tailored Security Configuration Application"), filed Mar. 5, 2020, the entire contents of which is hereby incorporated by reference as if fully set forth herein.

FIELD OF THE INVENTION

Techniques described herein relate to software applications and, more particularly, to applying tailored security policies to software applications.

BACKGROUND

A software application operates on a computing system with a certain set of privileges, which define what actions the operating system of the computing system allows the application to perform (such as have access to a network, open files in a file system, write to files to the file system, etc.). The least privilege principle in the context of software applications states that a software application should operate using the least set of privileges necessary to complete a computing job in order to increase security of the computing system.

Security policies are mechanisms for an operating system to restrict the functions or operations a software application can perform, i.e., by limiting the application to those privileges indicated in an associated security policy. For example, the Linux operating system provides a function seccomp, which is used to restrict the system calls allowed to be performed by a given application. The threat model of seccomp is as follows: To actually have an effect on the system, an attacker needs to invoke privileges of the attacker's choice. If an attacker manages to compromise an application, the next step is to try to trick the application into allowing privileges of the attacker's choice. A seccomp policy can restrict the set of privileges that are available to a thread, effectively limiting the attack surface exposed in an application running in the thread.

A typical security policy is an over-approximation, specified at an application-level granularity to capture all privileges that an associated application might need at any stage of execution, such as the single security policy applied to the whole of a target application depicted in FIG. 1. Generally, the application has access to all privileges identified in an associated security policy throughout execution of the application, whether the privileges are in use or not, exposing a constant attack surface during application execution.

However, not all code in an application will need access to all privileges indicated in a security policy specified at an application level. An applied security policy can be manually adjusted during application execution to be more restrictive. However, this is rarely done in practice, given that it is non-trivial to identify the privilege dependencies at various points in application execution. Furthermore, security mechanisms generally only allow tightening of security policies to grant fewer privileges. Adding privileges to an applied security policy (i.e., "widening" the policy) is generally not allowed, which prevents an attacker from adding privileges of the attacker's choice after an application has been compromised.

Furthermore, manually specifying security configurations for an application is error prone and tedious, and often requires expert knowledge of the application. For example, even if an application developer understands the code paths of an application, in many instances the application developer still does not know what privileges should be restricted due to dependencies created when linking third-party libraries or software packages, whose internal mechanisms are generally unknown to the application developer.

As such, to effectively reduce the attack surface presented by a target application at runtime, it would be beneficial to automatically identify the different privileges that may be used by various portions of a target application, and to grant only those privileges that may be used by the target application portions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

BRIEF DESCRIPTION OF THE DRAWINGS

In the drawings:

FIGS. 4A-4B depict example call graphs of target application.

FIG. 5 depicts a flowchart for using privilege dependency information for functions of a target application to identify privilege-based function sets, and modifying instructions for the target application to execute the functions of the target application using function set-specific security policies.

DETAILED DESCRIPTION

In the following description, for the purposes of explanation, numerous specific details are set forth in order to provide a thorough understanding of techniques described herein. It will be apparent, however, that techniques described herein may be practiced without these specific details. In other instances, well-known structures and devices are shown in block diagram form in order to avoid unnecessarily obscuring described techniques.

1. General Overview

Figure 2:
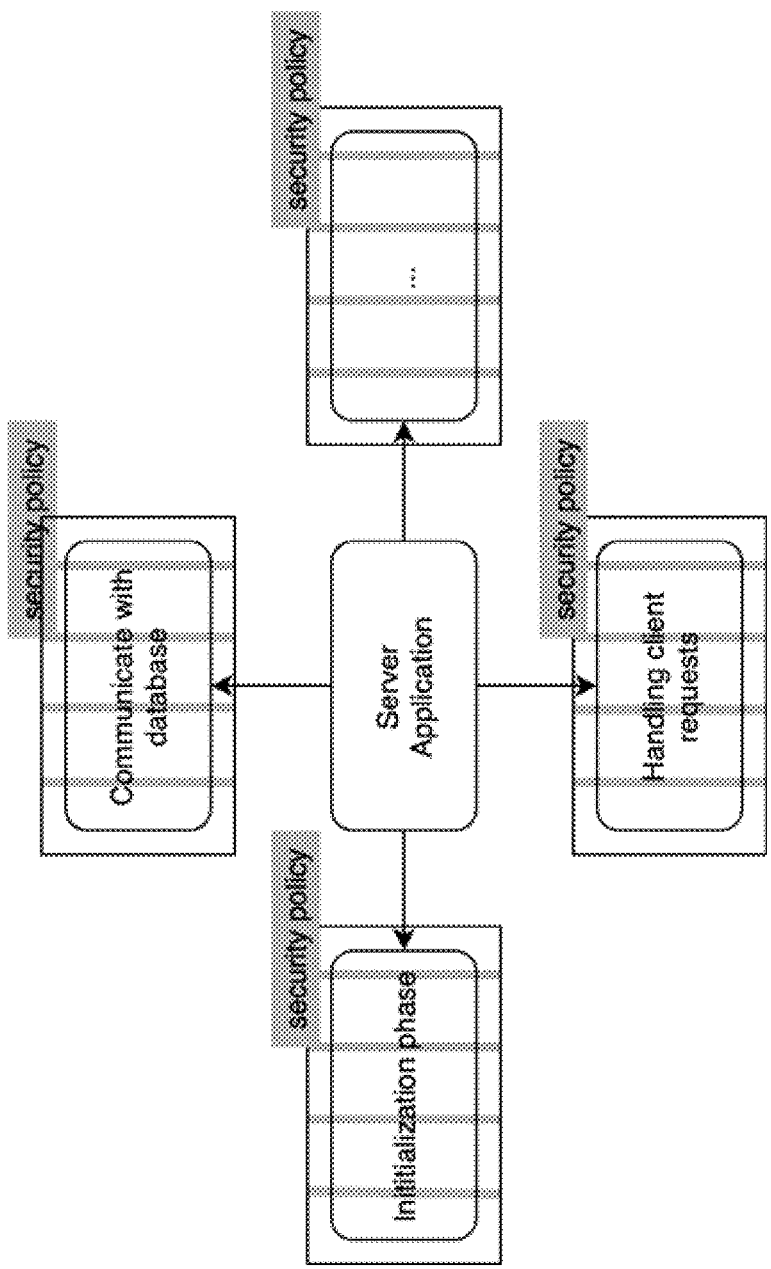
FIG. 2 depicts a granular application of security policies to different portions of a target application.

Techniques are described herein for limiting privileges for a target application such that the applied security policies are tailored to the privilege dependencies of the different functions of the target application, as depicted in FIG. 2. Specifically, the functions of the target application are grouped into different privilege-based function sets. The functions of each function set are executed in a thread with a function set-specific security policy applied thereto, rather than the whole application being executed by a single process with a single security policy.

Individual privileges dependencies of different functions of the application are determined based on static evaluation of the application code base. A call graph representing the various functions of the application is established, and the functions of the application are associated with the determined privilege dependencies.

An additional challenge addressed herein is the base rule that security policies must never "widen" such that privileges can be "dropped" from a security policy, but not regained. To account for this base rule, the call graph is modified using iterative backward dataflow analysis to associate the function nodes in the call graph with any privileges that are reachable from each node such that the privilege dependencies never "widen" as the call graph progresses from the root node.

Transition edges are identified within the call graph, where a transition edge connects function nodes with different sets of privileges. The function sets for the target application are determined based on the identified transition edges such that each function set includes functions that are associated with the same privilege annotations.

To implement the function set-specific security policies, which tailor allowed privileges based on annotations of the nodes belonging to the function sets, functions that are associated with different function sets are run using distinct threads. Accordingly, function calls implementing the identified transition edges are replaced, in instructions for the application (such as bytecode or machine code), with calls to wrapper functions. Each wrapper function transfers control to a different thread, to which a security policy for the replaced function is applied, and then uses the different thread to execute the replaced function. In this way, the called function is granted only the privileges associated with the function. After the called function terminates, control passes back to the originating thread, thereby restoring the broader security access associated with the calling function without allowing arbitrary widening of security policies.

It is noted that function calls between functions belonging to the same function set do not require transferring control to a different thread for callee function execution. As such, the cost of transferring control to a different thread is avoided for function calls among functions in the same function set, i.e., with the same security policy.

Limiting privileges at a function set level tailors security policies to the actual dependencies of the code that is currently executing with the goal of minimizing the exposed attack surface. By editing bytecode or machine code of the target application to include the wrapper functions, techniques described herein may be automatically implemented at run-time or compile-time without requiring developers to manually identify security dependencies, or to manually invoke the security mechanisms at all. As such, a reduced attack surface may be automatically enforced for any application running at a computing system, thereby increasing overall security of the system. Using techniques described herein, the effectiveness of attack surface reduction via function set-level security policy enforcement is drastically increased. For example, experimentation measuring the number of system calls granted to different functions in example programs shows up to 60% kernel attack surface reduction using function set-specific security policies compared to application-level policy enforcement.

Figure 1:
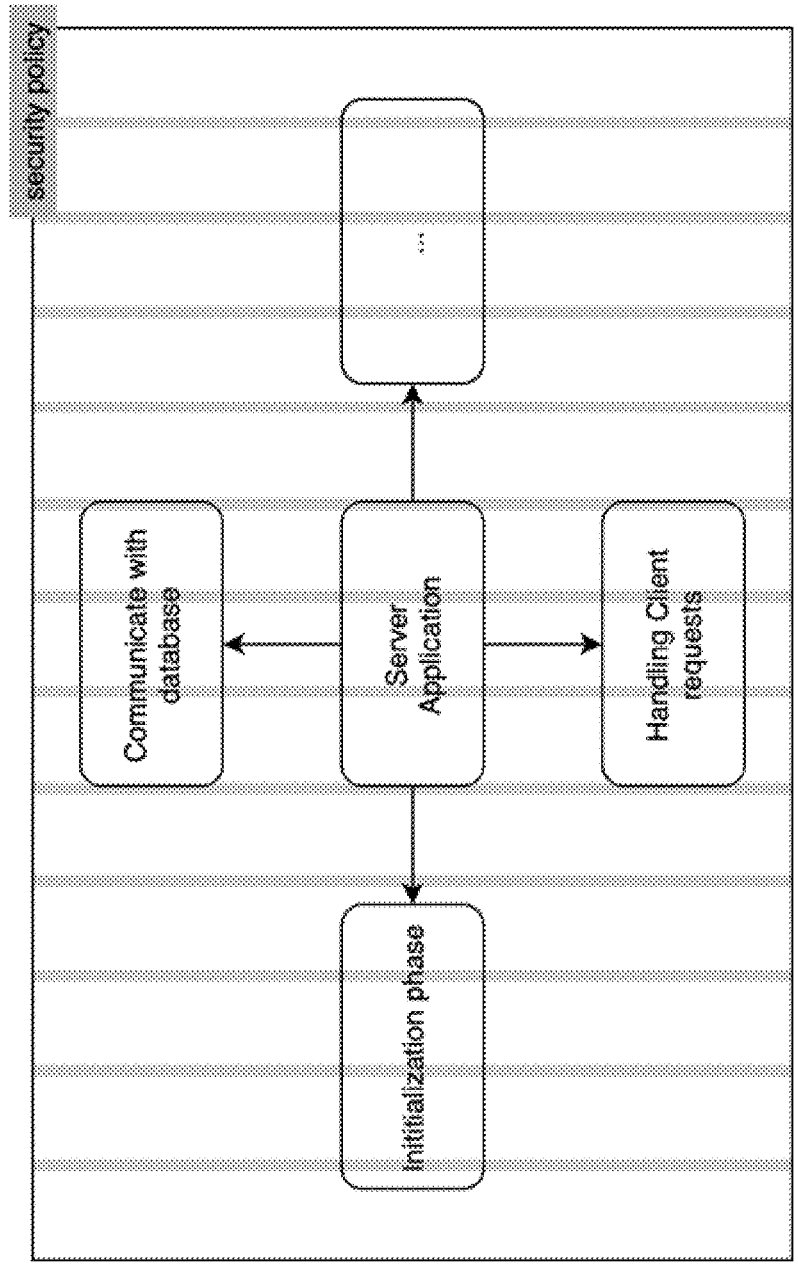
FIG. 1 depicts a single security policy applied to the whole of a target application.

To illustrate the reduced attack surface, a web application depicted in FIGS. 1 and 2 receives HTTP requests on port 80, processes the requests, and returns HTTP responses. To listen to new connections on port 80, the application invokes the system call bind( ) only once during the initialization phase to open a port for listening. Once the application listens on the port, it accepts connections ("handling client requests") and processes requests ("communicate with database"). In this example, attackers are able to find a flow in the request processing logic and are able to execute system calls of their choice. With a single security policy (as depicted in FIG. 1), attackers are able to bind to a new port (e.g., 8000) and therefore open a persistent communication channel to maintain a backdoor. Restricting the privileges at a function level (as depicted in FIG. 2) would have prevented attackers to open a port after the application has completed the initialization phase. Specifically, the application only needs to access the bind( ) system call during the initialization phase of the application, and can drop the privilege after the initial setup, denying the system call while handling client requests or communicating with the database, etc.

As a second example, an image parsing pipeline is composed of 3 stages: 1) read an image from a file, 2) extract metadata associated with the image, and 3) upload the metadata to a database. To read an image, the application calls the open( ) system call. To upload metadata to the database, the application connects to the database using the connect( ) system call. Attackers succeed in crafting a malicious image that triggers a security vulnerability in stage 2. With a single security policy, attackers are able to open any file accessible to the application (via the open( ) system call) and upload the file content to a remote server (via the connect( ) system call). Restricting the privileges at a function level would have prevented attackers from both opening files and connecting to a remote server, as these system calls are not necessary to perform stage 2 of the pipeline.

2. Example Computing System

Figure 3:
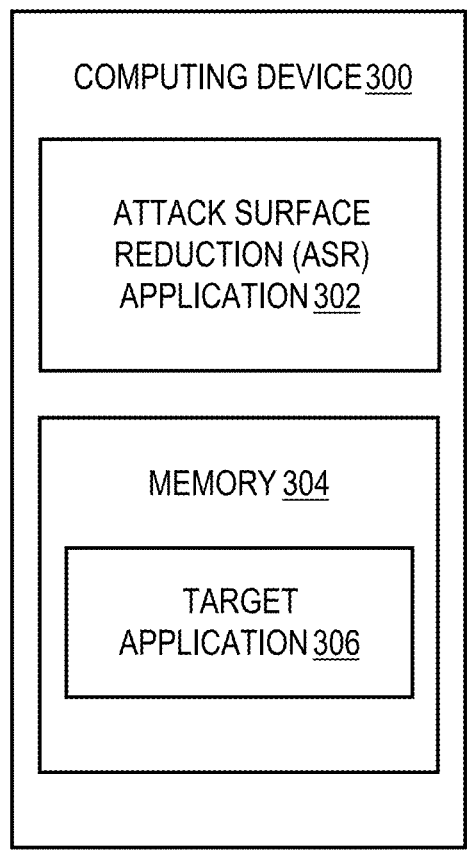
FIG. 3 is a block diagram that depicts an example computing device running an example attack surface reduction application.

FIG. 3 is a block diagram that depicts an example computing device 300 running an example attack surface reduction (ASR) application 302, which is described as implementing attack surface reduction techniques described herein. However, techniques described herein may be implemented in any way, including in hardware, software, or any combination of hardware and software.

Example computing device 300 further comprises memory 304 (e.g., DRAM), which stores instructions for a target application 306 (such as bytecode or machine code). As described in further detail below, ASR application 302 analyzes the instructions of target application 306 to identify function set-specific security policies to apply to target application 306 at run-time to reduce the attack surface presented by the target application. The threat model used herein assumes that an attacker can compromise code running on a thread that accepts attacker-controlled input, but cannot get access to arbitrary threads, which is a valid assumption for managed runtimes.

3. Function-Specific Privilege Dependency Discovery

An application, such as target application 306, is composed of several binary artifacts including the application binary and its libraries, each having its own set of privilege dependencies. ASR application 302 performs static call graph analysis on software artifacts in all reachable code of target application 306 to generate a call graph for the functions of the application, as described in the Tailored Security Configuration Application incorporated by reference above. The output of this static analysis is a call graph where each node represents a function of the target application, and each edge represents caller and callee relationships between the functions. Furthermore, each function node is annotated with any privilege dependencies for the represented function. A privilege dependency of a function is a privilege, such as a system call, that could possibly be used by the function.

To illustrate, ASR application 302 determines that target application 306 comprises five functions: main, and functions A-D. ASR application 302 further determines that main calls both function A and function B, that function A calls both function C and function D, and that function D also calls function A (i.e., double-recursion between function A and function D).

FIG. 4A depicts an example call graph 400 of target application 306 comprising nodes 402-410 representing the discovered functions of the target application, as well as edges 412-420 representing the discovered function calls among the functions. Edges 412-420 are directional such that the origin node of an edge represents the caller function and the destination node of the edge represents the callee function. To illustrate, edge 412 represents the existence of one or more function calls in main, represented by node 402, to function A represented by node 404.

During static analysis of target application 306, ASR application 302 performs privilege discovery independently on each artifact (application instructions and libraries) to generate a map that, for each function of target application 306, holds the set of privileges (such as system calls) that may be used by the function at runtime.

As in call graph 430 of FIG. 4A, ASR application 302 annotates the nodes of the call graph with the sets of privileges needed by the represented functions (i.e., the privilege dependencies of the nodes). For example, ASR application 302 determines that function B of target application 306 may use the open( ) system call, function C of target application 306 may use the read( ) system call, and function D of target application 306 may use the write (system call. Thus, in call graph 430, the nodes of call graph 400 are annotated with the system calls identified for the respective functions. It is noted that embodiments are not restricted to system call-type privileges.

4. Iterative Backward Dataflow Call Graph Analysis

Once ASR application 302 has generated an annotated call graph, such as graph 430, ASR application 302 uses an iterative backwards dataflow analysis to identify a set of privileges that are accessible by each node in the call graph, i.e., which are associated with the node or with any node reachable by the node in the call graph. Specifically, via the iterative backwards dataflow analysis, each node is annotated with the full set of privileges accessible by the node once the analysis reaches a fixed point, in that further iterations will not change the sets of privileges associated with any nodes in the graph. The iterative backwards dataflow analysis is guaranteed to terminate (upon determining that a fixed point for a target graph has been found) since the number of privileges that can be granted to a function is finite and the function set-specific security policies grow monotonically during the analysis. Annotating each node with the privileges reachable from the node allows implementation of function set-specific security policies, based on the annotated call graph, to satisfy the criteria that security policies must never "widen".

Formally, the iterative backward dataflow analysis is defined as follows:

Let Dm be the domain of dataflow values. Dm is the powerset over all privilege dependencies in the target application.

Let in [n] be the input of node n in the call graph in each iteration.

Let out [n] be the output of node n in the call graph after each iteration.

Let F be the flow function, such that out [n]=F (n).

For the iterative backward dataflow analysis, in [n] is defined in terms of its successor nodes' (i.e., its callees') out [ ]. More precisely:

$in^i[n]$=union ($out^{i-1}[n']$), where n' is a successor of n, i.e., n is the caller node and n' is a callee node called by n, and where i is the iteration count;

$out^i[n]$=F (n), where F [n]=union ($out^{i-1}[n]$, $in^i[n]$), i.e., F takes the union of the old $out^{i-1}[n]$, which represents the current annotations of the current node, and the new $in^i[n]$; and $out^i[n]$=union ($out^{i-1}[n]$, union ($out^{i-1}[n']$)), where n' is a callee of n.

Initially, $out^1[n]$ is the set of privileges used by node n.

The algorithm for the iterative dataflow analysis is given below:

```
i = 2
repeat until no change for all n
    in^i [n] = union (out^{i-1} [n'] ) for all callees n' of n
    out^i [n] = union (out^{i-1} [n] , in^1 [n] )
    i = i + 1
  end
end
```

To illustrate, a first pass of iterative dataflow analysis is applied to annotated call graph 430. The values of in [n] and out [n] are as follows:

n=function C: $in^2$ [C]=" "; $out^1$[C]="read( )"
n=function D: $in^2$ [D]=" "; $out^1$[D]="write( )"
n=function A: $in^2$ [A]="read( ), write( )"; $out^1$[A]=
n=function B: $in^2$ [B]=" "; $out^1$ [B]="open( )"
n=main: $in^2$ [main]="open( )"; $out^1$[main]=" "

The results of this first pass of iterative dataflow analysis are depicted in annotated call graph 440. Specifically, after the first pass, the annotations of nodes 406, 408, and 410 have not changed, node 404 is now annotated with the privileges from child nodes 408 and 410, and node 402 is now annotated with the privilege from child node 406.

Figure 4B:
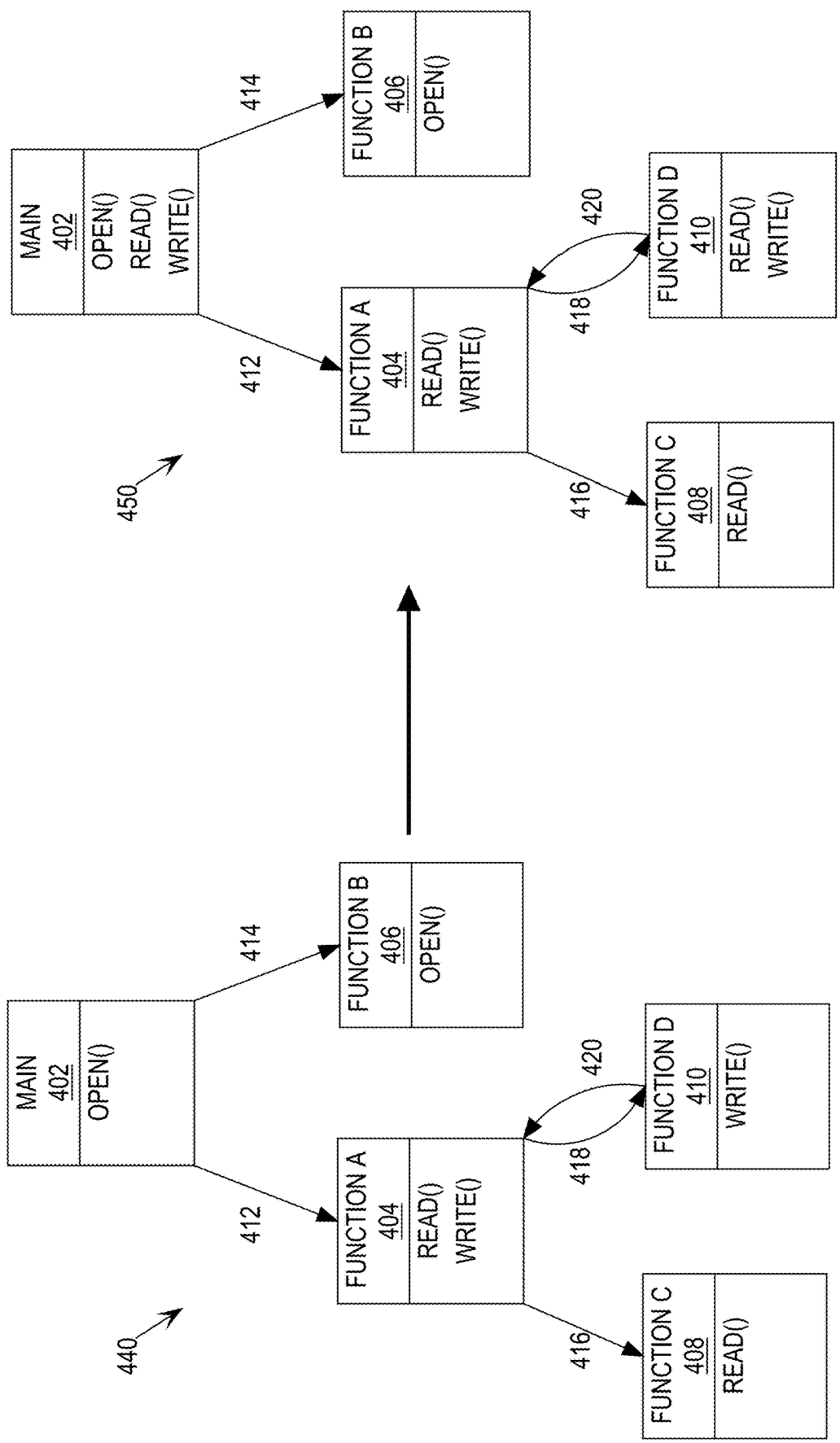

A second pass of iterative dataflow analysis is applied to annotated call graph 440 of FIG. 4B. The values of in [n] and out [n] are as follows:

n=function C: in$^3$ [C]=" "; out$^2$ [C]="read( )"
n=function D: in$^3$ [D]="read( ), write( )"; out$^2$[D]= "write( )"
n=function A: in$^3$ [A]="read( ), write( )"; out$^2$ [A]= "read( ), write( )"
n=function B: in$^3$ [B]=" "; out$^2$ [B]="open( )"
n=main: in$^3$ [main]="read( ), write ( ), open( )"; out$^2$ [main]="open( )"

The results of this second pass of iterative dataflow analysis are depicted in annotated call graph 450 of FIG. 4B. Specifically, after the second pass, the annotations of nodes 404, 406, and 408 have not changed, the annotations of node 402 have been augmented with the in [main] of the second pass, and the annotations of node 410 have been augmented with the in [D] of the second pass. It is noted that out [main] does not affect the annotations of any nodes since it is not a successor node to any other node.

As illustrated in FIG. 4B, eventually, a fixed-point is reached. F increases monotonically, and out [n] is bounded by Dm, which is the set of all possible dependencies in the graph. Once the fixed-point is reached, e.g., illustrated by call graph 450, each caller node always has a superset of privilege dependencies of all its callee nodes. ASR application 302 annotates each node in the call graph with the set of dependencies that are necessary to execute the function represented by the node or by any nodes that belong to the subgraph reachable from the node.

As indicated above, FIG. 4B depicts iterations of iterative backward dataflow analysis starting from annotated call graph 430. In call graph 440 of FIG. 4B, privilege dependencies from immediate child nodes (one step away) have been added to the annotations of the parent nodes. In call graph 450, privilege dependencies from child nodes that are two steps away have been added to the annotations of the parent nodes. In this case, call graph 450 represents the fixed-point for target application 306 in that the set of privileges associated with each node ensures that security policies will never "widen" across function calls. Specifically, as depicted by annotated call graph 450, the main function security policy must encompass open( ), read( ), and write( ) dependencies, as these system calls can be reached from main. However, for execution of function B, only the open( ) dependency is needed, and the security policy originating from main can be narrowed to only allow open( ) when executing function B.

5. Discovering Policy Transition Edges

Techniques described herein group an annotated call graph into function sets associated with distinct sets of privilege dependencies. As described in further detail below, the functions of each function set will be executed in a separate thread associated with an individual tailored security policy specific to the function set.

FIG. 5 depicts a flowchart 500 for using privilege dependency information for functions of a target application to identify privilege-based function sets, and modifying instructions for the target application to execute the functions of the target application using function set-specific security policies. At step 502 of flowchart 500, a plurality of function sets is identified among a plurality of functions of a particular application, the one or more functions of each function set being associated with a common set of privilege dependencies. For example, ASR application 302 identifies transition edges between nodes of fixed-point annotated call graph 450, where a transition edge connects nodes with different sets of privilege dependencies.

Figure 6:
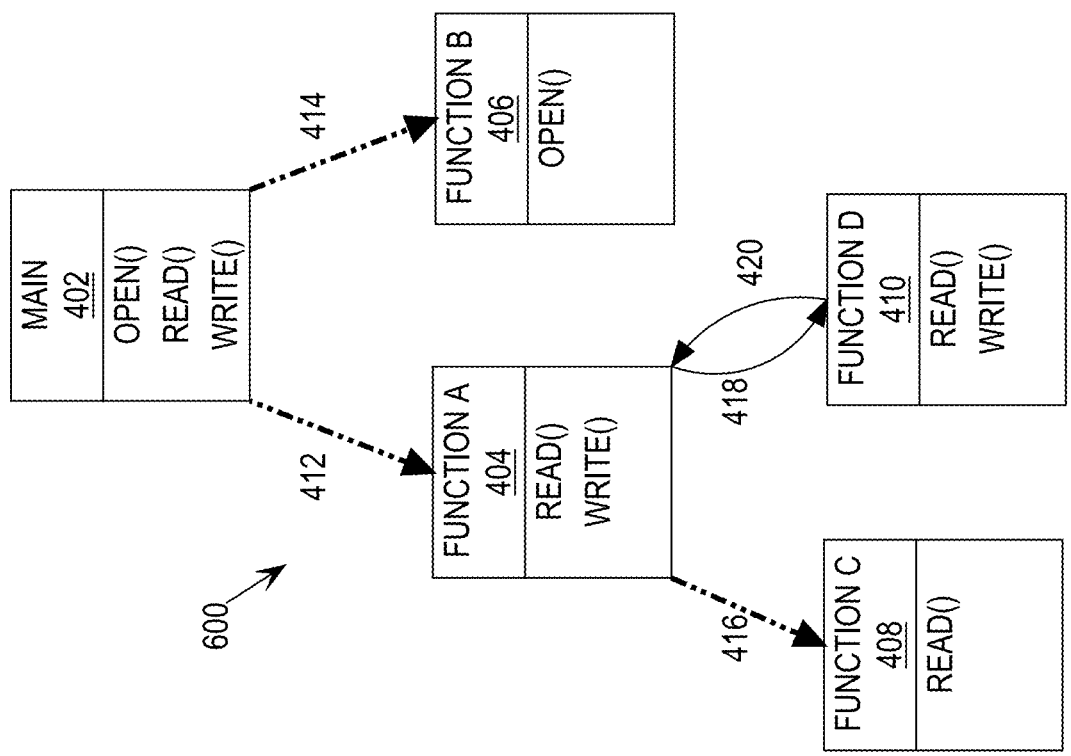
FIG. 6 depicts a fixed-point annotated call graph with highlighted transition edges.

While a transition is possible at every edge of the graph between two nodes, it is not necessary if the set of privilege dependencies for the nodes is the same. Starting from the root of graph 450 (e.g., main), ASR application 302 visits each edge of the graph once. If the edge links two nodes annotated with different sets of privilege dependencies, the edge is marked as a transition edge. FIG. 6 depicts fixed-point annotated call graph 600, with the same nodes, edges, and annotations as graph 450, with transition edges 412, 414, and 416 highlighted.

6. Fourth Step: Transitioning Between Policies

Based on the identified transition edges, ASR application 302 adjusts instructions for target application 306 to implement function set-specific security policies for the various functions of the target application. For many operating system security mechanisms, security policies are implemented by applying the policies to threads running an application. Thus, techniques described herein implement changes in granting privileges based on the privilege dependencies of the various function sets using distinct threads with applied security policies needed for the various portions of the application being run using the threads. To illustrate in connection with two functions A and B, with A calling B:

Function A is associated with a larger set of privileges than function B. Upon invocation of function B, a tighter security policy is enabled, allowing only the privileges of function B. However, when returning from function B, function A's privilege set needs to be reestablished. This issue is addressed herein by delegating the execution of function B to a distinct thread from a thread executing function A. As policies are thread-local, the policy may be tightened on the delegate thread, leaving the policy for the caller thread untouched. When function B returns, the delegate thread may be shut down, and execution is resumed on the caller thread.

Function A is associated with a more limited set of privileges than function B. The transition from function A to function B would violate the "must not widen" principle. This issue is addressed herein by considering that all of function B's privilege dependencies are associated with function A during the iterative backward dataflow analysis process described above. The broadening of the privilege set for function A does not worsen security: if an attacker manages to compromise function A, they will be able to invoke function B and thus get access to all of function B's privileges. Thus, the thread executing function A is associated with a security policy that grants all of the privileges required by function B, and as such, function B is run on the same thread as function A.

It is not feasible to implement the function set-specific security policies with a single thread since, while dropping a privilege from a security policy is generally allowed, most systems do not allow any arbitrary adding of privileges to a thread's security policy. Further, in general, once a privilege is dropped from a given thread, the privilege can never be granted to that same thread again. Thus, it would be feasible to tighten the security policy when main calls function A, however the system would not allow re-introducing the open( ) system call privilege to the security policy when control returns to main.

Thus, ASR application 302 delegates the execution of functions with different sets of privilege dependencies to different execution threads. For example, in the case of the function call to function A in main, a first thread executes main with a security policy that includes open( ), read( ), and write( ). The first thread delegates execution of function A to a second thread associated with a security policy that includes only read( ) and write( ) associated with function A, e.g., by creating the second thread and applying the narrower security policy to the created thread. Such thread creation is allowed since the second thread requires a subset of the security privileges granted to the first thread. Once function A execution is complete, control is returned to the first thread executing main, which is still associated with the broader security policy including open( ), read( ), and write( ). Thus, no arbitrary widening of security policies is required to maintain the needed privileges for the calling function.

Returning to the discussion of flowchart 500, at step 504, one or more transition function calls are identified in instructions for the particular application, where a transition function call invokes a target function of a first function set, of the plurality of function sets, from within a caller function of a second function set of the plurality of function sets. For example, ASR application 302 identifies function calls, in instructions for target application 306, corresponding to transition edges 412, 414, and 416. To illustrate in the context of call graph 600, ASR application 302 identifies the following as transition function calls: calls in main to either of function A or function B, and calls in function A to function C.

Figure 7:
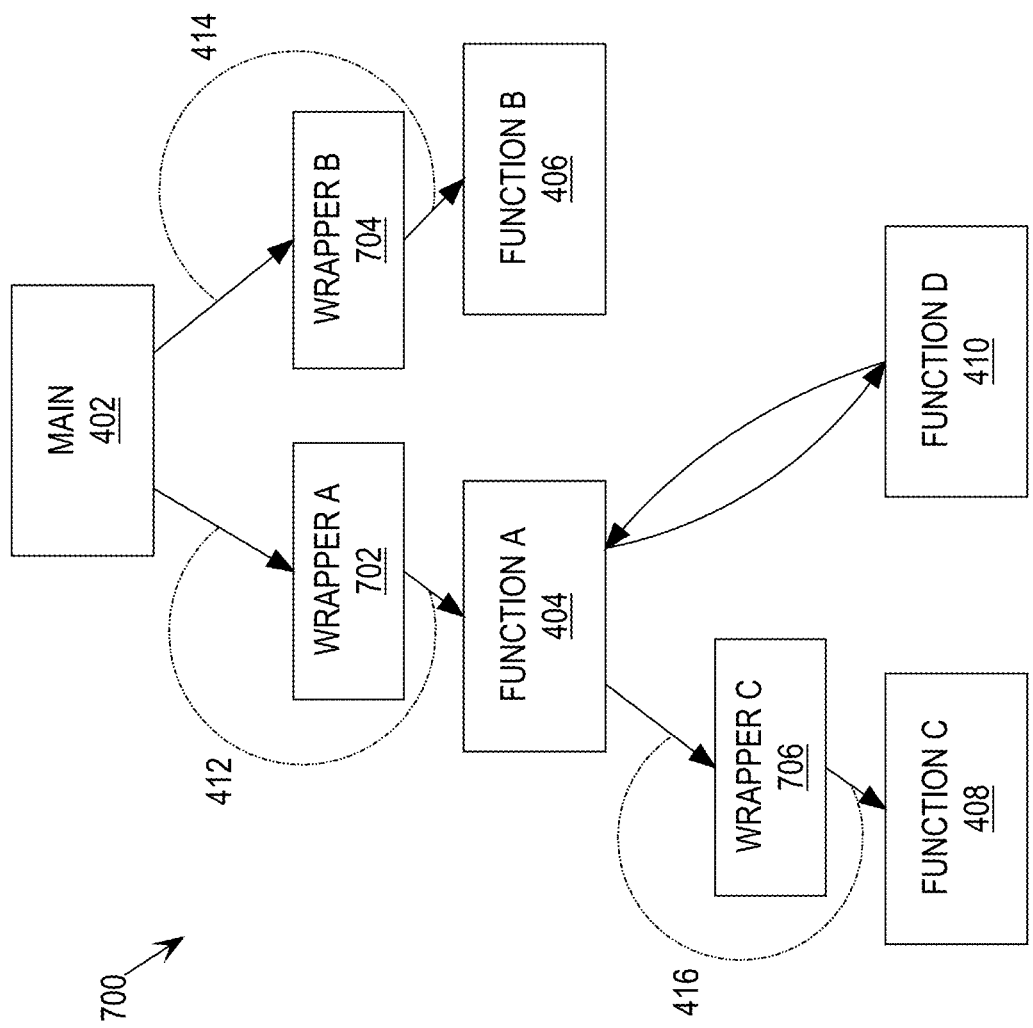
FIG. 7 depicts a call graph that includes wrapper functions that are inserted at transition edges.

At step 506 of flowchart 500, the instructions for the particular application are modified, to produce modified instructions, by replacing each transition function call, of the one or more transition function calls, with a wrapper function call that, when executed, causes a target function of said each transition function call to be executed by a separate thread with one or more privileges that satisfy a set of privilege dependencies associated with a function set that includes the target function. To illustrate, computing device 300 stores bytecode for target application 306 in memory 304, and ASR application 302 leverages binary rewriting techniques (e.g., Java bytecode rewriting, ksplice for live patching, etc.) to inject wrapper logic at each identified transition function call. FIG. 7 depicts a call graph 700 that includes wrapper functions 702-706 that are inserted at the transition edges 412-416, respectively.

Figure 8A:
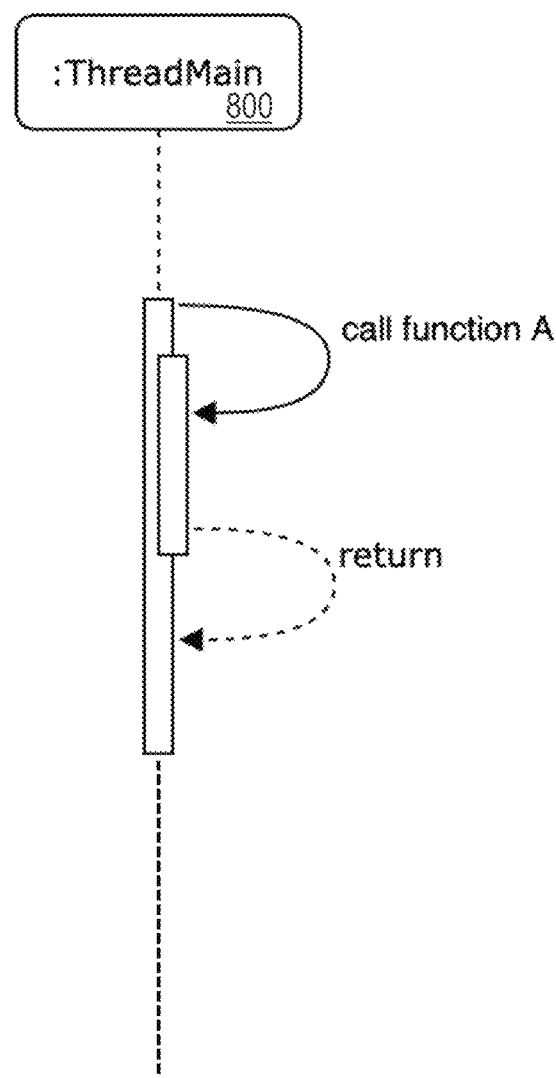
FIGS. 8A-8B depict example functionality of a target application before and after replacement of a transition function call with wrapper logic that spawns a new thread to execute the callee function.

The wrapper logic at each identified transition function call, in the target application instructions, implements transfer of control between threads and synchronization logic to synchronize functioning between the threads. FIG. 8A depicts functionality of target application 306 that comprises a function call from main to function A. In FIG. 8A, both main and function A are executed by a single thread 800, as would generally be indicated in instructions for target application 306 prior to instruction modification by ASR application 302 described above.

Figure 8B:
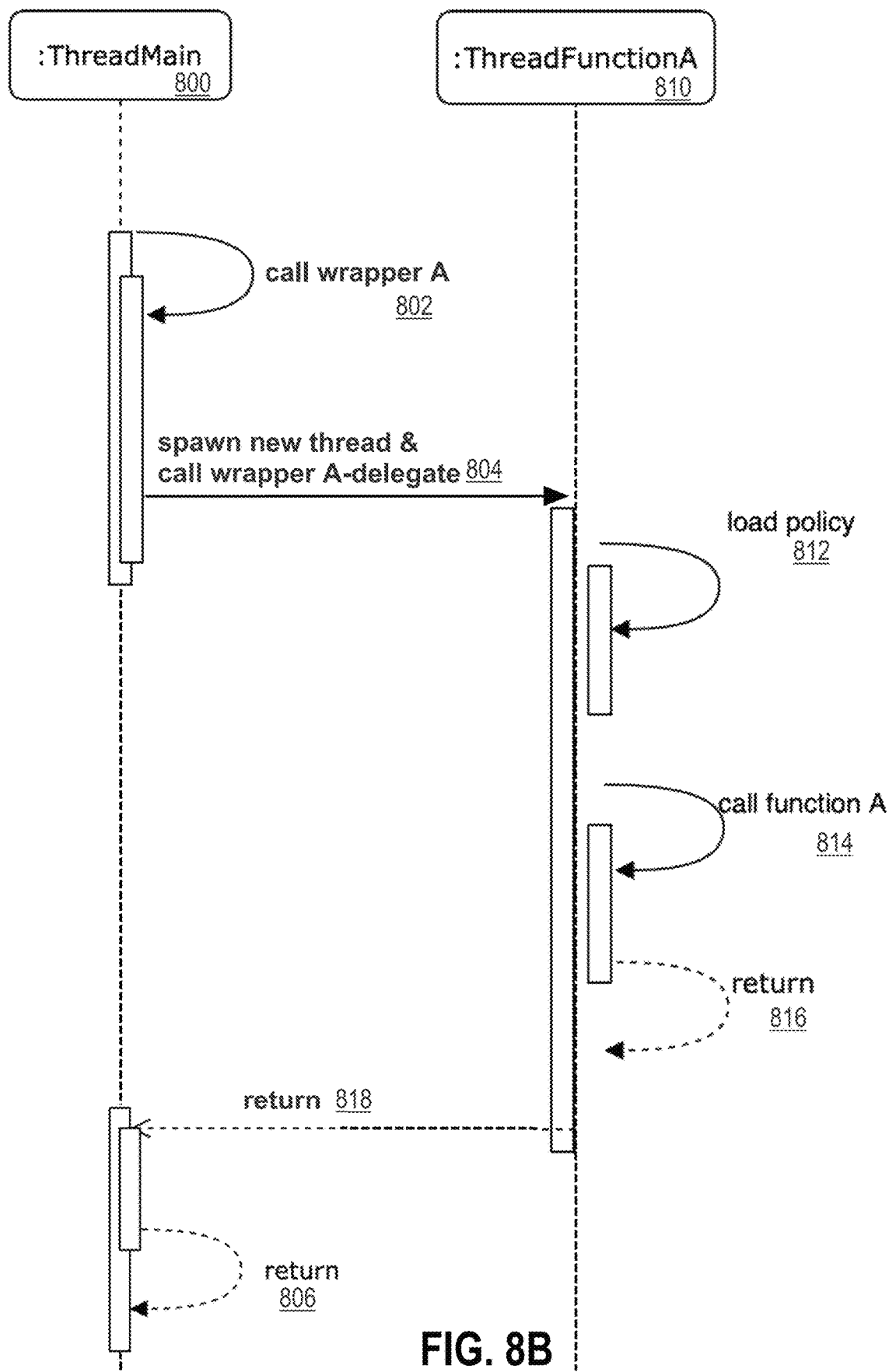

In contrast, FIG. 8B depicts the functionality of target application 306 after replacement of the transition function call from main to function A with wrapper logic that spawns a new thread 810. Specifically, thread 800 calls a wrapper A function (step 802), which spawns the new thread 810 and transfers control to the new thread by calling a wrapper A-delegate function to run on the new thread (step 804). The wrapper A-delegate function loads a security policy, for thread 810, that includes only the read( ) and write( ) privileges associated with function A as depicted in call graph 600 (step 812). The wrapper A-delegate function then calls function A (step 814), which, when complete, returns back to the caller (wrapper A-delegate) function (step 816). The wrapper A-delegate function returns back to its caller (wrapper A) function (step 818). The wrapper A function then returns to the caller (main) function (step 806).

Returning to the discussion of flowchart 500, at step 508, the modified instructions are stored in memory or on disk. For example, ASR application 302 stores modified bytecode for target application 306 in memory 304 at computing device 300. The modified instructions may then be executed by computing device 300 such that target application 306 is automatically executed with a reduced attack surface using function set-specific security policies. As another example, ASR application 302 makes changes to an executable file for target application 306, e.g., by loading one or more portions of the executable file into memory and adjusting the instructions represented in the portions of the executable file, as described in detail above.

As a further example, ASR application 302 receives a request to modify the instructions of target application 306. ASR application 302 returns the modified instructions (e.g., bytecode or machine code) to a source of the request as a response to the request.

7. Thread Optimizations

Techniques described above create threads to execute functions with different privilege dependencies. However, creating an execution thread has a cost. For example, using a micro-benchmark that evaluates the time of a single function call on a Linux system and using seccomp to apply security policies to the threads, it was determined that the time required to execute the function call:
 on the same thread as the caller function (without seccomp) was about 0.1 ns,
 on a different thread that was dynamically created for the function call and shut down upon function return (without seccomp) was about 1.1 ns,
 on a different thread that was dynamically created for the function call and shut down upon function return (with seccomp) was about 1.4 ns, and
 on a different thread with that was pre-initialized with an appropriate security policy applied (i.e., with seccomp) was 0.3 ns.
Thus, the overhead is largely caused by creating the thread on-demand. On top of thread creation, setting seccomp policies adds about 30% of overhead. However, when using a pre-initialized thread, the overhead significantly decreases.

There are several ways to improve performance of techniques for reducing application attack surface by doing better thread lifecycle management. For example, an execution thread can be reused if it already has the correct policy, or if the function to be executed would require a policy that is narrower than the one currently applied to the thread. For example, at run-time of target application 306, for every function set identified for the application, ASR application 302 pre-initializes a respective thread with the privileges identified for the function set. When execution of one of the functions in a particular function set is required, the function is executed using the thread with the corresponding set of privileges.

As another example, if it is not desirable to create the total number of threads that would be required to pre-initialize a thread for every function set, a capped number of threads are pre-initialized. When there is a need to run a particular function associated with a set of privilege dependencies for which a thread has not been pre-initialized, then the wrapper function may cause the system to initialize a thread on-the-fly. Alternatively, the wrapper function may cause the system to tighten the security policy of a pre-initialized thread that is associated with a super-set of the set of privileges associated with the particular function and use this thread to run the particular function.

Additionally, function nodes in the call graph that are annotated with similar (yet different) sets of privilege dependencies can be clustered together in a composite function set. A single set of privilege dependencies is associated with the nodes of the composite function set, which is the union of sets of privilege dependencies of function nodes, in the composite function set, from the fixed-point annotated call graph. Upon executing the functions in the composite function set, a single transition is needed (when entering the composite function set), at the expense of over-approximating the policy applied to some functions in the composite function set.

8. Hardware Overview

An application, such as ASR application 302 runs on a computing device and comprises a combination of software and allocation of resources from the computing device. Specifically, an application is a combination of integrated software components and an allocation of computational resources, such as memory, and/or processes on the computing device for executing the integrated software components on a processor, the combination of the software and computational resources being dedicated to performing the stated functions of the application.

One or more of the functions attributed to any process described herein, may be performed any other logical entity that may or may not be depicted in FIG. 3, according to one or more embodiments. In some embodiments, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
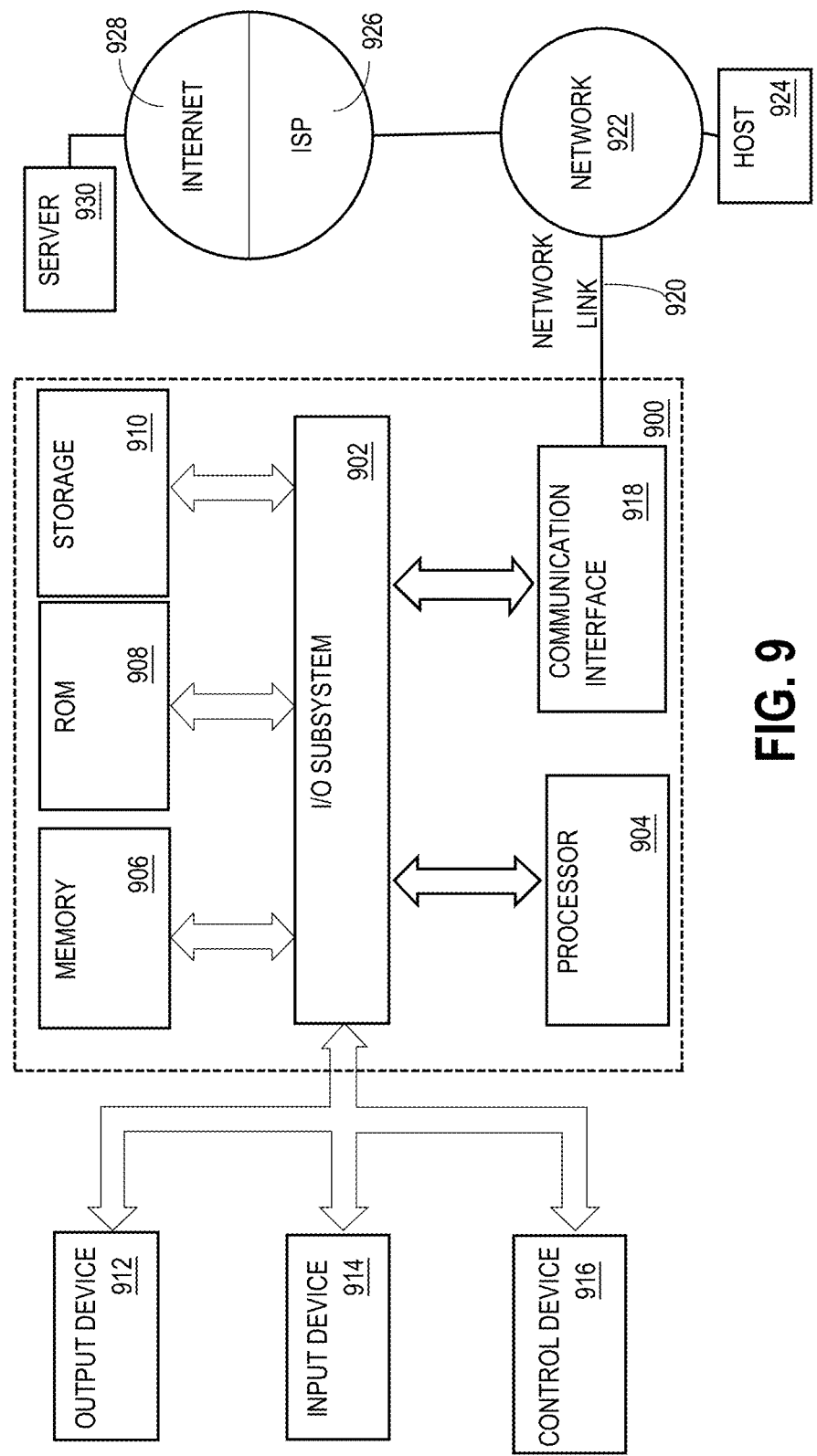
FIG. 9 is a block diagram that illustrates a computer system upon which some embodiments may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
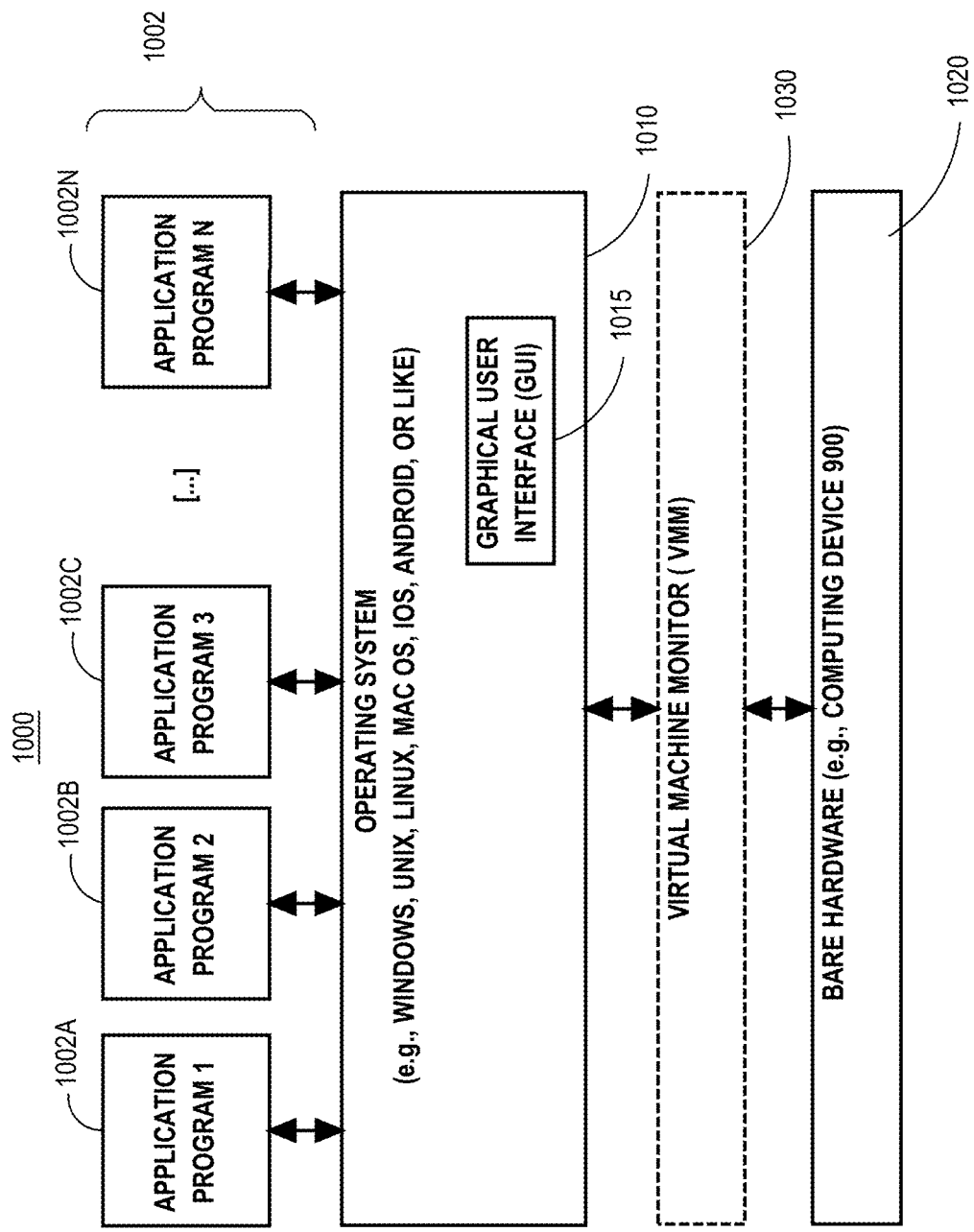
FIG. 10 is a block diagram of a basic software system that may be employed for controlling the operation of a computer system.

FIG. 10 is a block diagram of a basic software system 1000 that may be employed for controlling the operation of computer system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g., content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
identifying a plurality of function sets, among a plurality of functions of a particular application, one or more functions of each function set being associated with a common set of privilege dependencies including privileges granted for the one or more functions;
identifying one or more transition function calls in instructions for the particular application;
wherein a transition function call invokes a target function of a first function set, of the plurality of function sets, from within a caller function of a second function set of the plurality of function sets, the target function being associated with at least one granted privilege of the common set of privilege dependencies;
modifying the instructions for the particular application, to produce modified instructions, by replacing each transition function call, of the one or more transition function calls, with a wrapper function call that, when executed, causes a target function of said each transition function call to be executed by a separate thread with one or more privileges represented by a thread set of privilege dependencies associated with a function set that includes the target function, the thread set of privilege dependencies based on the at least one granted privilege; and
storing the modified instructions in memory or on disk;
wherein the method is performed by one or more computing devices.

2. The computer-implemented method of claim 1, wherein:
said identifying the plurality of function sets is based, at least in part, on a fixed-point call graph comprising (a) a plurality of nodes representing the plurality of functions, and (b) one or more edges representing respective one or more function calls between the plurality of functions in the particular application;
wherein each node, of one or more nodes of the fixed-point call graph, is associated with a set of privilege dependencies that comprises any privilege dependencies for a function represented by said each node and any privilege dependencies for functions represented by any nodes that are reachable from said each node via edges of the fixed-point call graph;
wherein the one or more functions of each function set, of the plurality of function sets, are represented by one or more contiguous nodes in the fixed-point call graph.

3. The computer-implemented method of claim 2, further comprising, prior to said identifying the plurality of function sets of the particular application:
- performing iterative backward dataflow analysis on a preliminary call graph that comprises the plurality of nodes and the one or more edges;
- wherein each node, of one or more nodes of the preliminary call graph, is associated with a preliminary set of privilege dependencies that comprises the any privilege dependencies for a function represented by said each node; and
- generating the fixed-point call graph by associating each node, of one or more nodes in the preliminary call graph, with an associated set of privilege dependencies identified via the iterative backward dataflow analysis.

4. The computer-implemented method of claim 3, further comprising:
- prior to said identifying the plurality of function sets of the particular application:
  - identifying one or more transition edges of the fixed-point call graph;
  - wherein each transition edge, of the one or more transition edges, connects nodes associated with different sets of privileges;
  - wherein at least one function set, of the plurality of function sets, comprises multiple functions; and
  - wherein functions of any function set, of the plurality of function sets, comprising the multiple functions are connected by non-transition edges in the fixed-point call graph.

5. The computer-implemented method of claim 1, further comprising:
- executing the modified instructions to cause a first thread executing a first function that includes a particular wrapper function call, which replaced a particular transition function call to a particular function, to execute a particular wrapper function called by the particular wrapper function call, where the particular wrapper function call is one of the wrapper function call that replaced one of the each transition function call;
- wherein the particular wrapper function shifts control to a second thread for execution of the particular function;
- wherein the second thread is associated with a different set of privileges than the first thread.

6. The computer-implemented method of claim 5, wherein prior to shifting control to the second thread, the particular wrapper function spawns the second thread and associates the second thread with the different set of privileges.

7. The computer-implemented method of claim 5, wherein the second thread is initialized prior to executing the particular wrapper function.

8. The computer-implemented method of claim 7, wherein the second thread is selected to run the particular function based on the second thread being associated with a set of privileges identified by a set of privilege dependencies associated with the particular function.

9. The computer-implemented method of claim 7, wherein:
- the second thread is selected to run the particular function based on the second thread being associated with a superset of a set of privileges identified by a set of privilege dependencies associated with the particular function;
- the superset comprises one or more privileges not identified by the set of privilege dependencies associated with the particular function; and
- the method further comprises, prior to the second thread executing the particular function, disassociating the second thread from the one or more privileges.

10. The computer-implemented method of claim 1, further comprising:
- receiving a request to modify the instructions for the particular application;
- wherein said modifying the instructions is performed in response to receiving the request; and
- returning the modified instructions as a response to the request.

11. The computer-implemented method of claim 1, wherein:
- each of one or more function sets, of the plurality of function sets, includes at least one function of a corresponding function set that is associated with one or more different privilege dependencies than other functions in said corresponding function set;
- the common set of privilege dependencies for each function set, of the one or more function sets, comprises a superset of privilege dependencies for the functions of said each function set.

12. One or more non-transitory computer-readable media storing one or more sequences of instructions that, when executed by one or more processors, cause:
- identifying a plurality of function sets, among a plurality of functions of a particular application, one or more functions of each function set being associated with a common set of privilege dependencies including privileges granted for the one or more functions;
- identifying one or more transition function calls in instructions for the particular application;
- wherein a transition function call invokes a target function of a first function set, of the plurality of function sets, from within a caller function of a second function set of the plurality of function sets, the target function being associated with at least one granted privilege of the common set of privilege dependencies;
- modifying the instructions for the particular application, to produce modified instructions, by replacing each transition function call, of the one or more transition function calls, with a wrapper function call that, when executed, causes a target function of said each transition function call to be executed by a separate thread with one or more privileges represented by a thread set of privilege dependencies associated with a function set that includes the target function, the thread set of privilege dependencies based on the at least one granted privilege; and
- storing the modified instructions in memory or on disk.

13. The one or more non-transitory computer-readable media of claim 12, wherein:
- said identifying the plurality of function sets is based, at least in part, on a fixed-point call graph comprising (a) a plurality of nodes representing the plurality of functions, and (b) one or more edges representing respective one or more function calls between the plurality of functions in the particular application;
- wherein each node, of one or more nodes of the fixed-point call graph, is associated with a set of privilege dependencies that comprises any privilege dependencies for a function represented by said each node and any privilege dependencies for functions represented by any nodes that are reachable from said each node via edges of the fixed-point call graph;

wherein the one or more functions of each function set, of the plurality of function sets, are represented by one or more contiguous nodes in the fixed-point call graph.

14. The one or more non-transitory computer-readable media of claim 13, wherein the one or more sequences of instructions, when executed by one or more processors, cause, prior to said identifying the plurality of function sets of the particular application:
performing iterative backward dataflow analysis on a preliminary call graph that comprises the plurality of nodes and the one or more edges;
wherein each node, of one or more nodes of the preliminary call graph, is associated with a preliminary set of privilege dependencies that comprises the any privilege dependencies for a function represented by said each node; and
generating the fixed-point call graph by associating each node, of one or more nodes in the preliminary call graph, with an associated set of privilege dependencies identified via the iterative backward dataflow analysis.

15. The one or more non-transitory computer-readable media of claim 14, wherein the one or more sequences of instructions, when executed by one or more processors, cause:
prior to said identifying the plurality of function sets of the particular application:
identifying one or more transition edges of the fixed-point call graph;
wherein each transition edge, of the one or more transition edges, connects nodes associated with different sets of privileges;
wherein at least one function set, of the plurality of function sets, comprises multiple functions; and
wherein functions of any function set, of the plurality of function sets, comprising the multiple functions are connected by non-transition edges in the fixed-point call graph.

16. The one or more non-transitory computer-readable media of claim 12, wherein the one or more sequences of instructions, when executed by one or more processors, cause:
executing the modified instructions to cause a first thread executing a first function that includes a particular wrapper function call, which replaced a particular transition function call to a particular function, to execute a particular wrapper function called by the particular wrapper function call, where the particular wrapper function call is one of the wrapper function call that replaced one of the each transition function call;
wherein the particular wrapper function shifts control to a second thread for execution of the particular function;
wherein the second thread is associated with a different set of privileges than the first thread.

17. The one or more non-transitory computer-readable media of claim 16, wherein prior to shifting control to the second thread, the particular wrapper function spawns the second thread and associates the second thread with the different set of privileges.

18. The one or more non-transitory computer-readable media of claim 16, wherein the second thread is initialized prior to executing the particular wrapper function.

19. The one or more non-transitory computer-readable media of claim 18, wherein the second thread is selected to run the particular function based on the second thread being associated with a set of privileges identified by a set of privilege dependencies associated with the particular function.

20. The one or more non-transitory computer-readable media of claim 18, wherein:
the second thread is selected to run the particular function based on the second thread being associated with a superset of a set of privileges identified by a set of privilege dependencies associated with the particular function;
the superset comprises one or more privileges not identified by the set of privilege dependencies associated with the particular function; and
the one or more sequences of instructions further comprise instructions that, when executed by one or more processors, cause, prior to the second thread executing the particular function, disassociating the second thread from the one or more privileges.

21. The one or more non-transitory computer-readable media of claim 12, wherein the one or more sequences of instructions, when executed by one or more processors, cause:
receiving a request to modify the instructions for the particular application;
wherein said modifying the instructions is performed in response to receiving the request; and
returning the modified instructions as a response to the request.

22. The one or more non-transitory computer-readable media of claim 12, wherein:
each of one or more function sets, of the plurality of function sets, includes at least one function of a corresponding function set that is associated with one or more different privilege dependencies than other functions in said corresponding function set;
the common set of privilege dependencies for each function set, of the one or more function sets, comprises a superset of privilege dependencies for the functions of said each function set.

* * * * *